E. F. KELLUM.
MINING APPARATUS.
APPLICATION FILED AUG. 24, 1911.
1,020,649.
Patented Mar. 19, 1912.
5 SHEETS—SHEET 1.
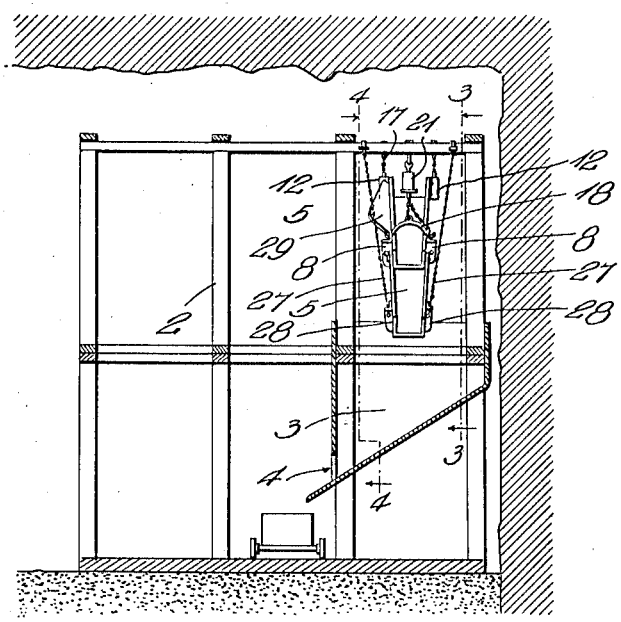
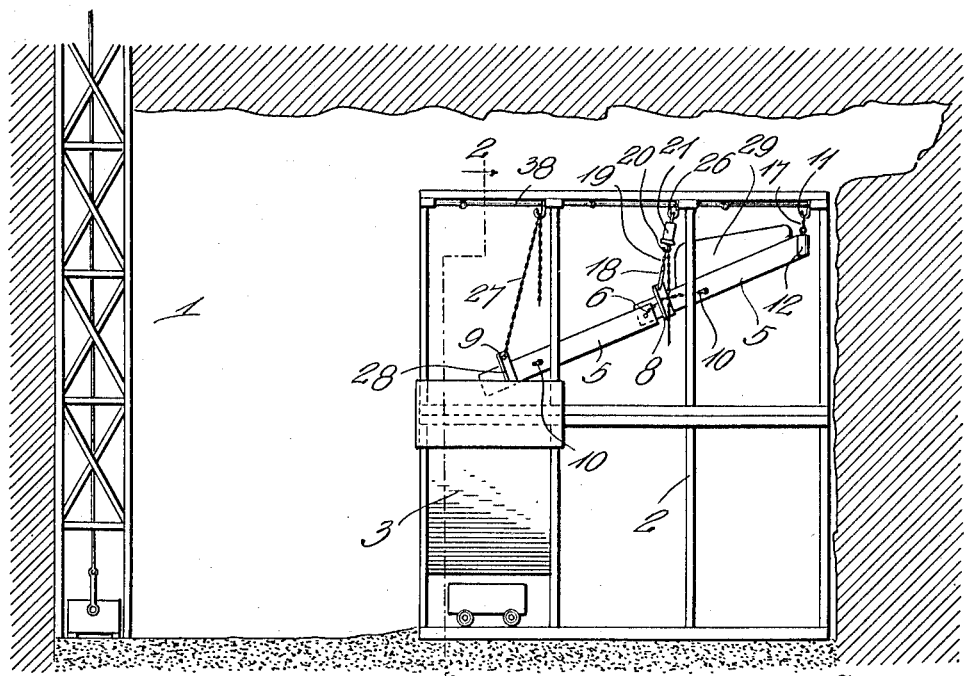
Witnesses
Inventor
E. F. Kellum
Attorneys

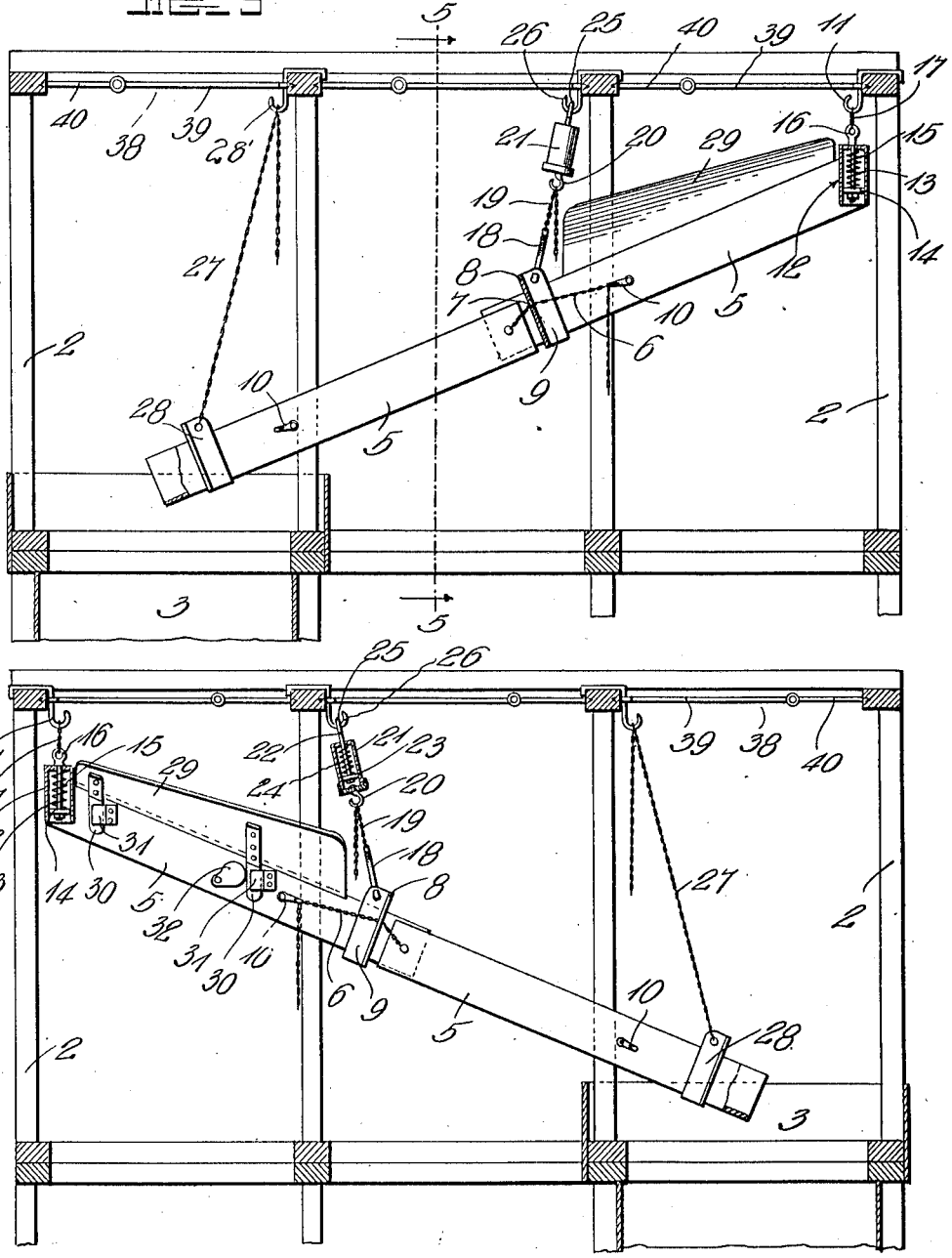

E. F. KELLUM.
MINING APPARATUS.
APPLICATION FILED AUG. 24, 1911.
1,020,649.
Patented Mar. 19, 1912.
5 SHEETS—SHEET 3.
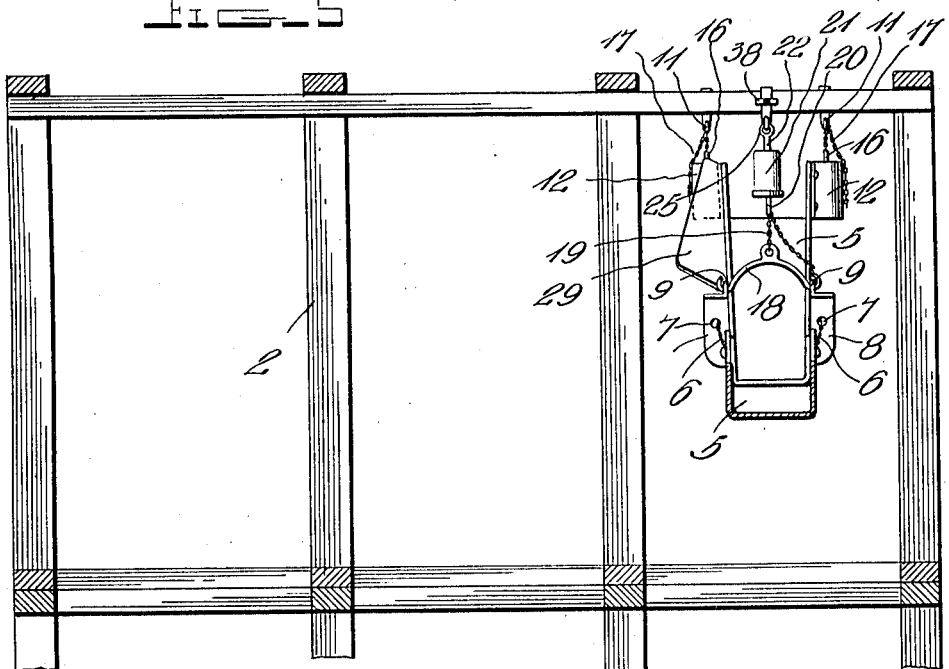
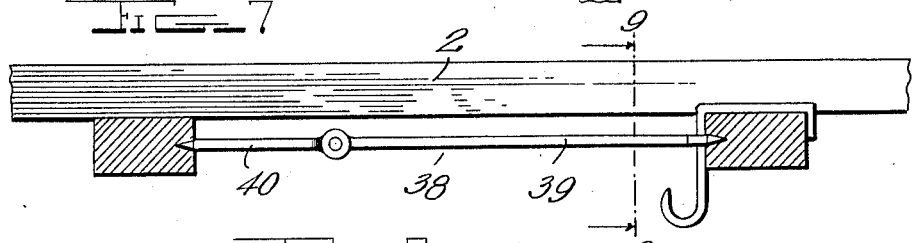
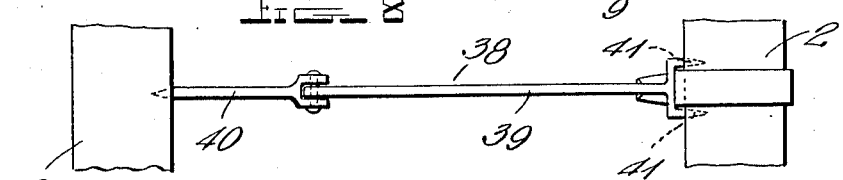
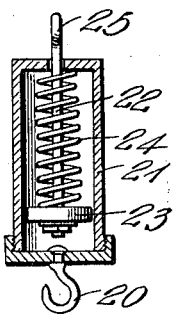
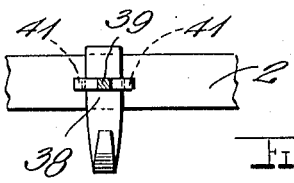
Witnesses
C. E. Hunt
Inventor
E. F. Kellum
by H. R. Willson & Co.
Attorneys E. F. KELLUM.
MINING APPARATUS.
APPLICATION FILED AUG. 24, 1911.
1,020,649.
Patented Mar. 19, 1912.
5 SHEETS—SHEET 4.
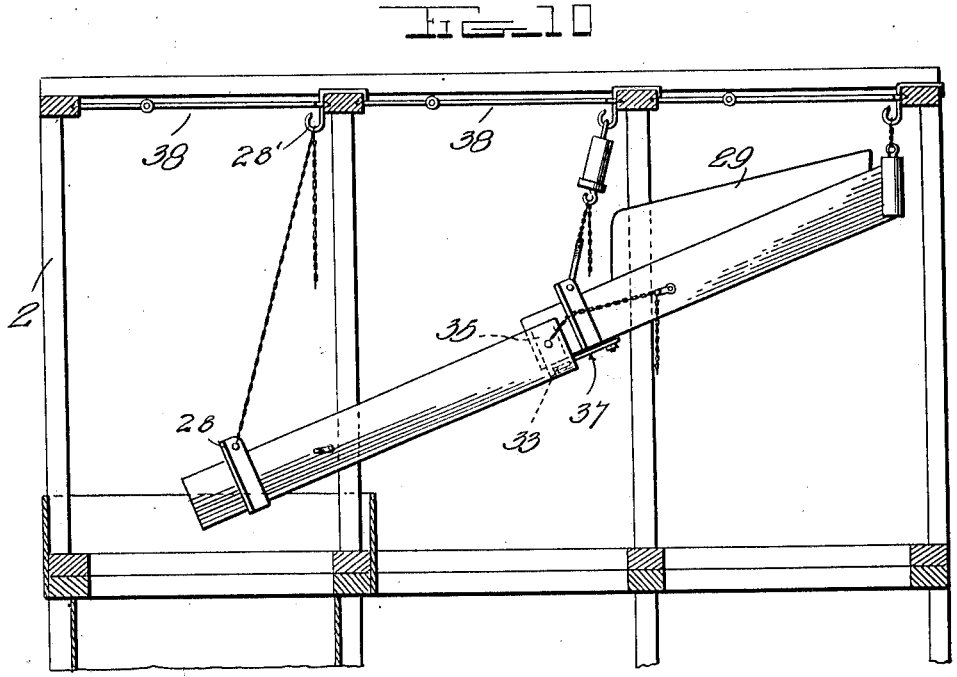
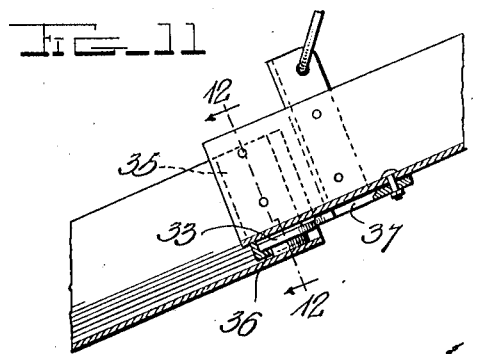
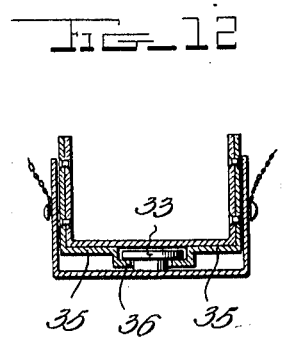
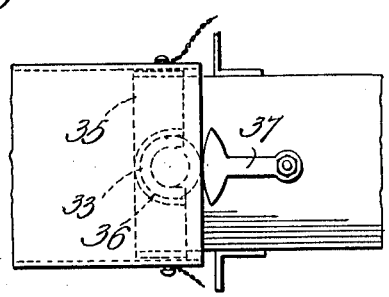
Witnesses
Inventor
E. F. Kellum
by H. B. Willson & Co.
Attorneys

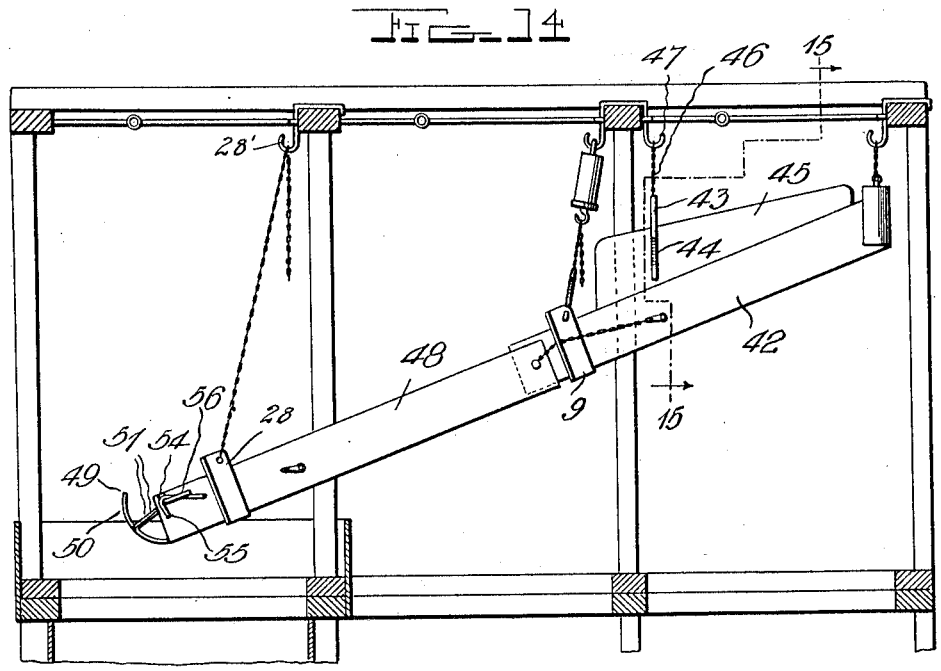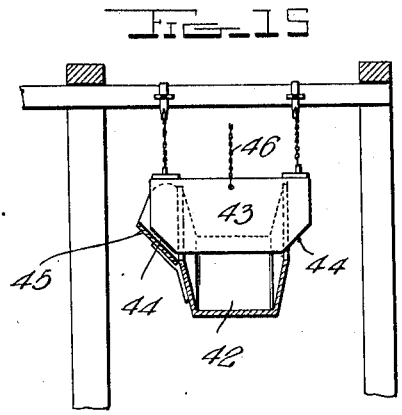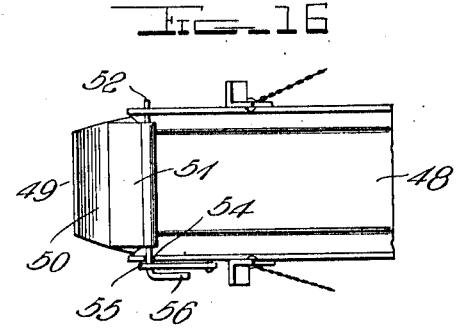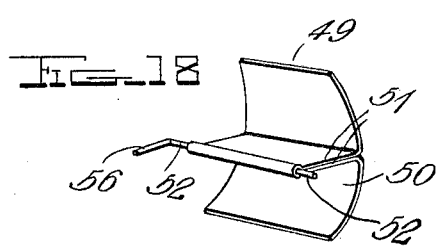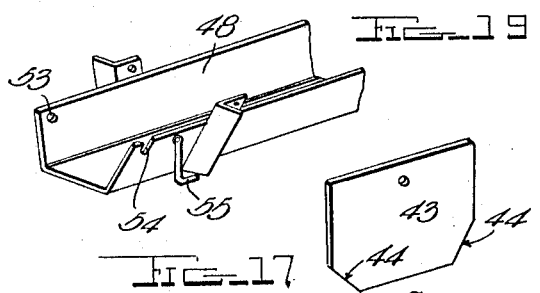

UNITED STATES PATENT OFFICE.

ELMO FINLEY KELLUM, OF DON LUIS, ARIZONA.

MINING APPARATUS.

1,020,649.   Specification of Letters Patent.   Patented Mar. 19, 1912.

Application filed August 24, 1911. Serial No. 645,696.

*To all whom it may concern:*

Be it known that I, ELMO F. KELLUM, a citizen of the United States, residing at Don Luis, in the county of Cochise and State of Arizona, have invented certain new and useful Improvements in Mining Apparatus; and I do declare the following to be a full, clear, and exact description of the invention, such as will enable others skilled in the art to which it appertains to make and use the same.

This invention relates to improvements in mining apparatus.

One object of the invention is to provide an apparatus of this character by means of which the handling of ore in mines will be greatly facilitated.

Another object is to provide an improved construction and arrangement of ore conducting slides formed in sections and having means whereby the same are adjusted to the desired inclination and which are adapted to be readily shifted to various parts of the workings, whereby the ore may be carried or directed thereby to the permanent chutes in the mine.

With these and other objects in view, the invention consists of certain novel features of construction, and the combination and arrangement of parts as will be more fully described and claimed.

In the accompanying drawings: Figure 1 is a vertical sectional view through a portion of a mine showing the construction and arrangement of the invention; Fig. 2 is a similar view on the line 2—2 of Fig. 1; Fig. 3 is a vertical sectional view on the line 3—3 of Fig. 2; Fig. 4 is a similar view on the line 4—4 of Fig. 2; Fig. 5 is a vertical transverse sectional view on the line 5—5 of Fig. 3; Fig. 6 is a detail vertical sectional view through one of the yielding supporting devices for the slides; Fig. 7 is a detail sectional view through a portion of the frame showing the manner in which the slide supporting hooks are secured to the frame; Fig. 8 is a plan view of the parts shown in Fig. 7; Fig. 9 is a detail cross sectional view on the line 9—9 of Fig. 7; Fig. 10 is a vertical sectional view through a portion of the frame showing a modified construction of the slides; Fig. 11 is a detail vertical longitudinal sectional view through a portion of the slides shown in Fig. 10 illustrating the manner in which the sections of the slides are secured together; Fig. 12 is a cross sectional view on the line 12—12 of Fig. 11; Fig. 13 is a bottom plan view of the parts shown in Fig. 11; Fig. 14 is a view similar to Fig. 3 showing a modified arrangement of the slides in which they are provided with doors; Fig. 15 is a vertical section taken on the line 15—15 of Fig. 14; Fig. 16 is a plan view of the lower end of the lower section of the modified arrangement of the slide; Fig. 17 is a detail perspective view of the door for the upper slide section of the slide; Fig. 18 is a similar view of the door or closure for the lower section of the slide. Fig. 19 is a detail perspective view of the lower end of the lower section of the slide.

Referring more particularly to the drawings, 1 denotes a drift in a mine in which my improved apparatus is arranged and from which the ore is removed by stoping and which may be one-thousand feet or more under ground.

The invention is to be applied to the usual frame work 2 which is arranged in the drift or stope and which consists of sills arranged on the floor of the stope and having secured thereto a series of uprights, preferably about seven feet high for each floor of the frame, said frame being any desired number of "sets" high, in the present instance the frame is shown as consisting of two floors or "sets." The uprights are connected at their upper ends by oppositely disposed beams or joists arranged to form the "square sets." Arranged at a suitable location in the lower floor of the frame is a permanent or stationary ore discharging chute 3 having its bottom inclined toward one side in which is formed a discharge opening 4 whereby the ore may be delivered from the chute into a car or receptacle. Connected at its lower end with the upper end of the chute 3 and extending upwardly at a suitable angle and in any desired direction into the upper slides of the frame is one or more ore receiving slides 5 whereby the ore from the upper portion of the stope or drift is carried down and discharged into the chute. The slides 5 are each formed of a series of sections of which there may be any number two being herein shown. The lower end of the upper section of the slides is of slightly less width than the upper end and the said lower end of the upper slide section over-laps and fits into the upper end of the adjoining lower section, said engaging ends of the sections being secured together by chains 6, which are secured to the upper end of the lower section and pass through guide apertures 7 arranged in stop flanges 8, formed on reinforcing straps, or U-shaped hanger bars or stirrups 9 secured to the upper section of the slides adjacent to its lower end as shown clearly in Figs. 3 and 4. The chains 6 after passing through the apertures in the flanges 8 of the hanger are engaged with hooks 10 secured to the outer sides of the upper slide section as shown.

The upper sections of the slides are yieldingly and detachably secured to hooks or hangers 11 secured to the upper joists or beams of the frame, said upper ends of the slide sections having secured to their opposite sides spring casings 12 in which are arranged piston rods 13 having on their inner ends pistons 14 between which and the upper ends of the casings are arranged coiled springs 15. The upper ends of the piston rods 13 are slidably engaged with openings of the casings and have formed on their upper ends, eyes 16 to which are connected the lower ends of hanger chains 17, adapted to be engaged with the hooks or hangers 11 on the frame thereby yieldingly supporting the upper ends of the slides.

The lower end of each upper slide section and the upper end of each lower section are yieldingly supported by a bail 18 connected to the upper ends of the hanger bar or stirrup 9 and to which is connected the lower end of a chain 19, the upper portion of which is adapted to be adjustably connected to a hook 20 arranged on the lower end of a cylinder 21. In the cylinder 21 is arranged a piston rod 22, having on its inner end a piston 23 between which and the upper end of the cylinder is arranged a coiled spring 24. The outer end of the piston rod 22 is provided with an eye 25 which is connected with a hook or hanger 26 secured to the adjacent joist or beam of the frame. The lower end of the lower section of the slide is supported by means of chains 27, the lower ends of which are secured to a stirrup 28 on the lower end of the sections while the upper ends of said chains are secured to hangers 28' secured to the adjacent joist or beam of the frame. By thus constructing and arranging the supporting devices, it will be readily seen that the slides will be yieldingly supported and may be adjusted by lengthening or shortening the hanger chains to change the slides to any desired angle or inclination. By this arrangement of supports the position of the slides may also be readily changed so that said slides may project in any direction from the permanent chute 3 of the frame.

Adapted to be detachably secured to one side of a slide section is an inclined or laterally deflected guide plate 29, to the lower portion of which are secured downwardly extending inclined lugs 30 which are adapted to be engaged with brackets or keepers 31 secured to the adjacent side of the slide section to which the plate is applied whereby said guiding plate is held in position. The lugs 30 are held in engagement with the brackets or keepers 31 by latches 32 which are pivoted to the side of the slide section thus securing the lugs 30 in engagement with the keepers.

In Figs. 10, 11, 12 and 13 of the drawings, is shown modified means for connecting the sections of the slides together, said connection in this instance comprising a flanged head 33 secured to the inner side of the upper end of the lower section of the slide and adapted to be engaged with a recess formed by the lower portion of a U-shaped hanger or stirrup 35 secured to the lower end of the upper section and having arranged therein a segmental seat 36 adapted to receive the head 33 on the lower section of the slide. The head 33 when thus engaged with the stirrup and seat in the upper section of the slide, is held in position by a latch 37 pivoted to the under side of the section as shown. In all other respects the construction and arrangement of the slide just described are the same as the slide described in the first part of the specification and a further description of these parts is not thought to be necessary.

The hangers with which the supporting devices and hanger chains of the slides are engaged are preferably secured to the beams or joists of the frame by means of fastening devices 38, said devices comprising bars 39 and 40 which are hingedly connected together at their inner ends as shown. The bar 39 has its outer end bifurcated or provided with a pair of sharp fastening prongs 41 which are adapted to straddle the hangers or hooks and to be forced into the adjacent portion of the joists or beams on each side of the hangers, as shown. The bar 40 has its outer end sharpened to form a barb or point which is forced into the beam or joist. The combined length of the two bars or sections of the fastening devices is greater than the space between the beams or joists engaged thereby so that when the prongs and point on the outer ends of the bars are engaged with the beams and the bars straightened out, said prongs and sharp end of the bars will be forced into the beams thus firmly holding the fastening devices in position and in operative engagement with the hangers whereby the latter are securely fastened to the beams.

While I have herein shown and described the preferred manner of supporting the slides, it is obvious that if desired the supporting springs may be dispensed with and the slides supported at their ends by one or more hangers and supporting chains similar to the arrangement of the chains 27 which support the lower ends of the lower section of the slide thus dispensing with the bail 18. By yieldingly supporting the slides as herein shown and described the same are prevented from being broken by heavy pieces of ore or rock thrown therein or by concussion resulting from blasting operations, the slide will yield to the pressure exerted while if rigidly secured it would be liable to break. By forming the slides in sections the length of the same may be increased or diminished as required.

In the modified arrangement of the slide shown in Figs. 14 and 15 the upper section 42 of the slide has arranged thereon near its lower end a door 43 comprising a metal plate which is adapted to fit on the upper edges of the sides of the slide and which has its lower outer corners beveled or cut off at an angle as shown at 44, whereby the ends of the plate will fit closer against the inclined guiding or deflecting plate 45 arranged on the side of the slide which corresponds to the plate 29 shown in the first form of the invention. The plate or door 43 is supported in position at the end of the slide by a chain 46 adapted to be adjustably connected with a hanger 47 arranged on the adjacent over-head cross bar of the supporting frame. In the outer end of the lower section 48 of the slide is arranged a door or closure 49 comprising a curved plate 50 which tapers from one end toward the other and which has formed on its concaved side adjacent to its wider end a laterally projecting attaching flange 51 in which is secured a shaft 52. The ends of the shaft 52 project beyond the side edges of the flange 51 and form pintles one of which is engaged with a bearing aperture 53 formed in one side of the slide while the other pintle is engaged with a bearing notch 54 formed in the opposite side of the slide. The pintle or end of the shaft is held in operative engagement with the notch 54 by means of a hook 55 which is pivoted to the adjacent side of the slide and is adapted to be hooked over the pintle or end of the shaft as shown. The pintle or end of the shaft which engages the notch 54 is preferably extended and bent at an angle to form a crank handle 56 whereby the shaft may be rocked to swing the narrow end of the plate into and out of engagement with the slide thereby closing and opening the lower or discharge end of the same. These doors 43 and 49 are designed to convert the slide into a chute having discharge regulating means.

While I have herein shown and described the slide sections having the doors or closures as a modified form of the invention it is obvious that the doors or closures shown in the modification may be applied to the preferred form of the slides if desired.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as claimed.

Having thus described my invention, what I claim as new is:

1. In a mining apparatus a supporting frame, a chute arranged therein, a slide having its lower end arranged to discharge into said chute, said slide being formed of a plurality of sections, the lower end of one section fitting into the upper end of the adjoining section, stirrups secured to the lower end of one section, and having formed thereon laterally extending flanges provided with guide apertures, means detachably and adjustably connecting the adjacent ends of adjoining sections and passing through the guide apertures in said flanges, and means to yieldingly and adjustably connect the slides with the upper frame.

2. In a mining apparatus a supporting frame, a slide arranged therein, said slide being formed of upper and lower sections, means to secure said sections together, spring casings secured to the upper end of the upper section, spring retracted rods arranged in said casing, hanger chains secured to the upper ends of said rods, hangers secured to the upper beams or joists of the frame and adapted to receive said chains, a stirrup secured to the lower end of the upper section, a bail secured to said stirrup, a hanger secured to the joists above said lower end of the upper slide section, a spring casing, a spring retracted rod arranged in said casing and having its outer end engaged with said hanger, a hook on the lower end of said casing, a chain secured to said bail and adapted to be adjustably engaged with said hook, whereby the lower end of the upper section and the upper end of the lower section of the slide are supported and hanger chains secured to the lower end of the lower section of the slide, whereby said end is adjustably supported.

3. In a mining apparatus a supporting frame comprising sills, a series of uprights secured to said sills, joists to connect the upper ends of said uprights, a series of hangers engaged with said joists, hanger fastening devices, said devices comprising hingedly connected bars, prongs formed on the outer end of one of said bars, a point formed on the outer end of the other bar, said pointed and pronged ends of the bars being adapted to be engaged with the joists or beams with which said hangers are engaged with the said prongs strengthening the hangers whereby when the bars are straightened out the points and prongs on the outer ends thereof will be forced into the joists thus securing said bars and the hangers in place, a chute arranged in said frame, a slide positioned to discharge into said chute, said slide being formed in a plurality of separable sections, means to detachably connect said sections together and means to yieldingly and adjustably connect the same with said hangers.

4. In a mining apparatus a supporting frame, a chute arranged therein, a slide positioned to discharge into said chute, said slide being formed in a plurality of separable sections, the engaging end of one of which over-laps or fits into the adjoining end of the other section, a flanged head formed in the engaging end of one of said sections, a hanger secured to the end of the adjacent section, a seat arranged in said hanger and adapted to receive the head of the other section, a latch adapted to secure said head in engagement with said seat and means to yieldingly and adjustably secure said sections of the slides into the frame.

5. In a mining apparatus, a supporting frame, a slide arranged therein and formed of a plurality of detachably connected sections, hanger stirrups secured to one end of each of said sections, apertured flanges formed on said hangers, hooks secured to the sides of the sections, connecting chains secured to one section and passing through the apertures in said flanges and engaging with the hooks on the adjacent section, whereby said sections are detachably secured together, means for adjustably securing said sections to said supporting frame, an inclined deflecting plate, and means for detachably securing said plate to one side of a slide section.

6. In an apparatus of the character described, a supporting frame, a chute arranged therein, a slide mounted with its lower end disposed over said chute, said slide comprising a plurality of detachably connected sections, a door plate adapted to be engaged with the upper section of the slide, a hanger, a supporting chain attached to said plate and adapted to be engaged with said hanger whereby the plate is removably supported in operative engagement with the slide section, and a closure pivotally and removably secured in the discharge end of the lower section of the slide.

7. In an apparatus of the character described a supporting frame, a chute arranged therein, a slide mounted with its lower end disposed over said chute, said slide comprising a plurality of detachably connected sections, a plate removably engaged with the lower end of the upper section of the slide, a door or closure arranged in the discharge end of the lower section of the slide, said door or closure comprising a curved plate having its side edges tapered from one end toward the other to fit between the inclined sides of the chute when in an operative engagement therewith, a laterally extending flange formed on the concave side of the plate, a shaft arranged in said flange, said shaft having its ends projected to form pintles adapted to be engaged with open and closed bearings formed in the sides of the slide, a pivoted retaining member adapted to be engaged with the pintle in the open bearing of the slide section whereby the shaft is removably held in operative position, and a crank handle formed on one of said shaft ends or pintles whereby said door or closing plate may be swung into and out of operative engagement with the end of the sliding section.

In testimony whereof I have hereunto set my hand in presence of subscribing witnesses.

ELMO FINLEY KELLUM.

Witnesses:
  W. H. TOWNSEND,
  M. M. KEHOE.

---

Copies of this patent may be obtained for five cents each, by addressing the "Commissioner of Patents, Washington, D. C."